Jan. 6, 1959 T. HAFNER 2,867,778

SURFACE WAVE TRANSMISSION LINE COUPLER

Filed Oct. 12, 1953 2 Sheets-Sheet 1

INVENTOR.
THEODORE HAFNER

SURFACE WAVE TRANSMISSION LINE COUPLER

Filed Oct. 12, 1953 2 Sheets-Sheet 2

INVENTOR.
THEODORE HAFNER

United States Patent Office 2,867,778

Patented Jan. 6, 1959

2,867,778

SURFACE WAVE TRANSMISSION LINE COUPLER

Theodore Hafner, New York, N. Y.

Application October 12, 1953, Serial No. 385,489

9 Claims. (Cl. 333—33)

This invention relates to transmission lines and more specifically to transmission lines for connecting antennas to transmitters or receivers.

One of the objects of the invention is a U. H. F. transmission line permitting direct connection between a relatively elevated or distant antenna and a home receiving set such as used for television reception.

Another object of the invention is an insulated conductor adapted to transmit non-radiating surface waves and coupled over non-radiating launching and receiving devices to coaxial or two-wire systems or wave guides which in turn are connected to the terminals of an antenna or a receiver respectively.

A further object of the invention is to connect surface wave launching and receiving devices to the corresponding antenna and receiver terminals, respectively, over balancing devices for matching the impedance of the antenna and receiver circuits, or connections derived therefrom, with the impedance of the launching and receiving devices themselves.

Still another object of the invention is mechanically to combine a balancing device with a launching or receiving device in the form of a single unit.

Still further an object of the invention is a launching or receiving device containing two or more sections of different diameters and inclinations, including a relatively steeply inclined outer section matching with the field of the non-radiating surface wave extending around the conductor connecting launching and receiving devices respectively, and a relatively flatly inclined inner section coupled to the steep section and matching or matchable with the terminal circuit of antenna, receiver, transmitter or any other utilization device.

A more specific object of the invention is a launching or receiving device of relatively simple and inexpensive construction yet adapted to cover efficiently a predetermined range of V. H. F., U. H. F. or any other microwave frequencies while at the same time designed to constitute a high or low pass filter preventing noises outside of and preferably below that predetermined frequency range or ranges from reaching receiver, transmitter or any other utilization terminals as the case may be.

Another specific object of the invention is a launching or receiving device detachably supporting, or supported on, a balancing device so as to facilitate disassembly for transportation and storage, and assembly for mounting and operation, all this without requiring particular skill, tools or instrumentation.

Still further an object of the invention is a launching device which is foldable, collapsible or telescopable, either in a plane passing through its axis and in a plane perpendicular to its axis or the axis of the surface wave conductor.

An additional object of the invention is to make the launching and receiving device of plastic with a conducting layer applied thereon or incorporated therein having attached at both ends thereof plastic covers, the cover at its large end serving as a closure member and the cover at its small end supporting or surrounding a balancing device matching the launching or receiving device, with the surface wave conductor extending therefrom or thereto.

These and other objects of the invention will be more fully described in the drawings annexed herewith in which Fig. 1 illustrates a transmission line and its mount embodying certain principal features of the invention.

Figs. 2, 3, 4 and 5 in different elevations partly in section represent a launching and receiving device with a balancing device attached thereto.

Fig. 6 represents a supporting structure for the surface wave conductor.

Figs. 7 and 8 and 9 and 10 represent collapsible launching devices.

Figures 1, 2, 3, 4, 5:
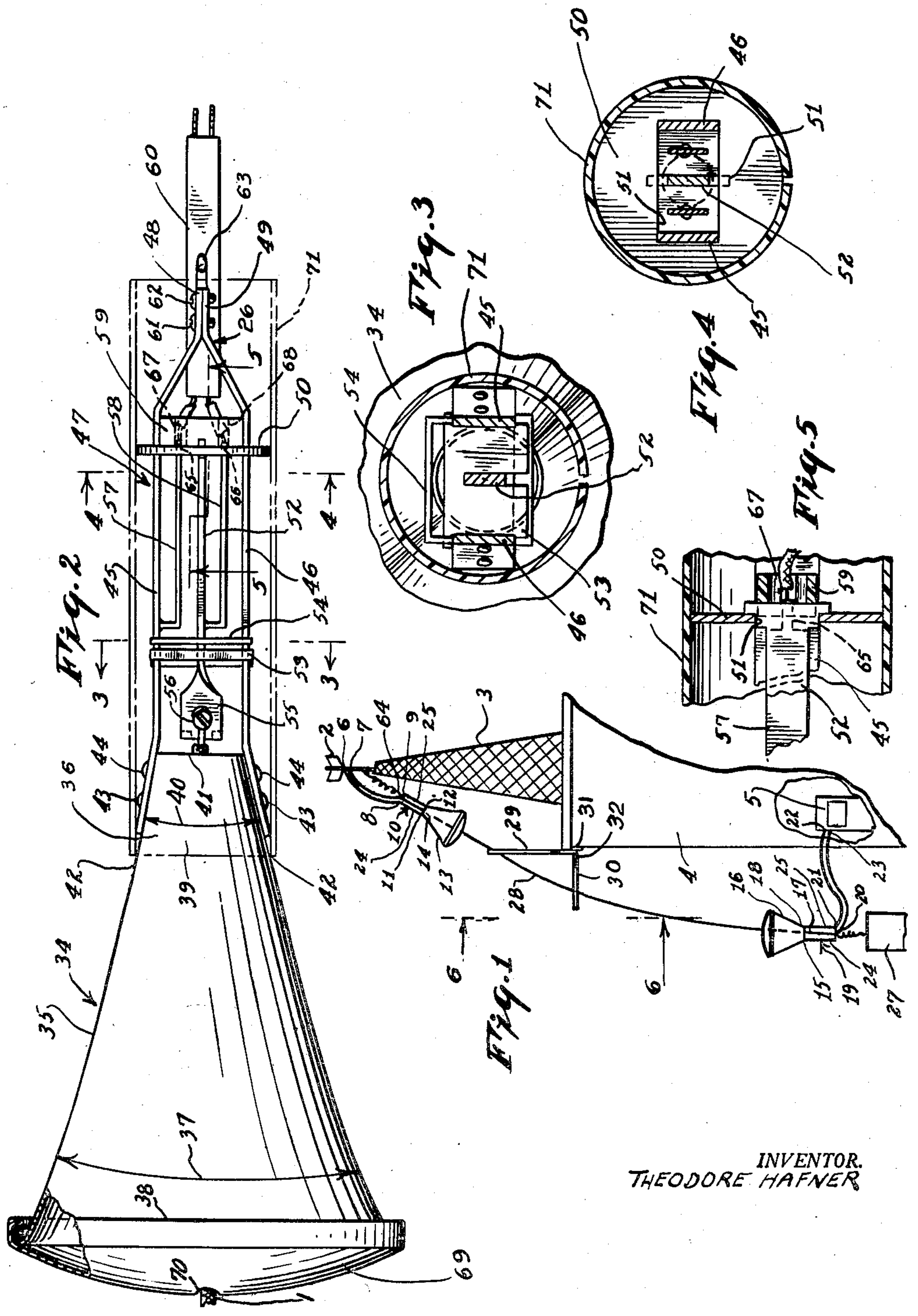

In Fig. 1 a surface wave conductor such as disclosed for example in U. S. Ser. No. 151,025 is shown to extend as indicated at 1 between a television receiver antenna 2 mounted on tower 3 on top of building 4 and a television receiver set 5 mounted in the interior of building 4.

At the transmitting end of surface wave conductor 1, terminals 6, 7 of antenna 2 are connected to the inward ends or terminals 8, 9 of a balancing or matching device 10 one of the outward terminals 11, 12 of which is connected to the small end of a conductive launching horn 13 while the other outward terminal of balancing device 10 is connected through an opening 14 at the small end of launching horn 13 to the surface wave conductor 1.

At the receiving end of the transmission line, conductor 1 is connected over an opening 15 at the small end of a conductive receiving horn 16 to one of the inward terminals 17, 18 of another balancing or impedance matching device 19; the other inward terminal of balancing device 19 is connected to the receiving horn 16 itself, at the smaller end thereof.

The outward terminals of 20, 21 of balancing device 19 in turn are connected to the input terminals 22, 23 of television receiver 5.

Attachment of the entire transmission line 1, 10, 13, 16, 19, occurs in the following manner, see Figs. 2, 3, 4 and 5. Each balancing device 10, 19 has a pair of electrical connections 24, 25 forming mechanical brackets or arms attached to and rigidly supporting horns 13, 16 at one end thereof, and attached together as schematically indicated at 26 at the other end thereof, permitting the entire unit 10, 13 and 16, 19 respectively to be attached to the top of tower 3 or to a portion of foundation 27 (Fig. 1) respectively. In this way conductor 1 can be caused to assume a relatively taut condition or a position as straight as possible, reducing curvatures around corners or any other deviations from a substantially straight line to a minimum in accordance with the requirements for the transmission of non-radiating surface waves.

The only substantial curvature remaining in the entire transmission line is at 28 around the roof or a top corner of building 4.

Figures 6, 7, 8, 9, 10, 11, 12, 13, 14:
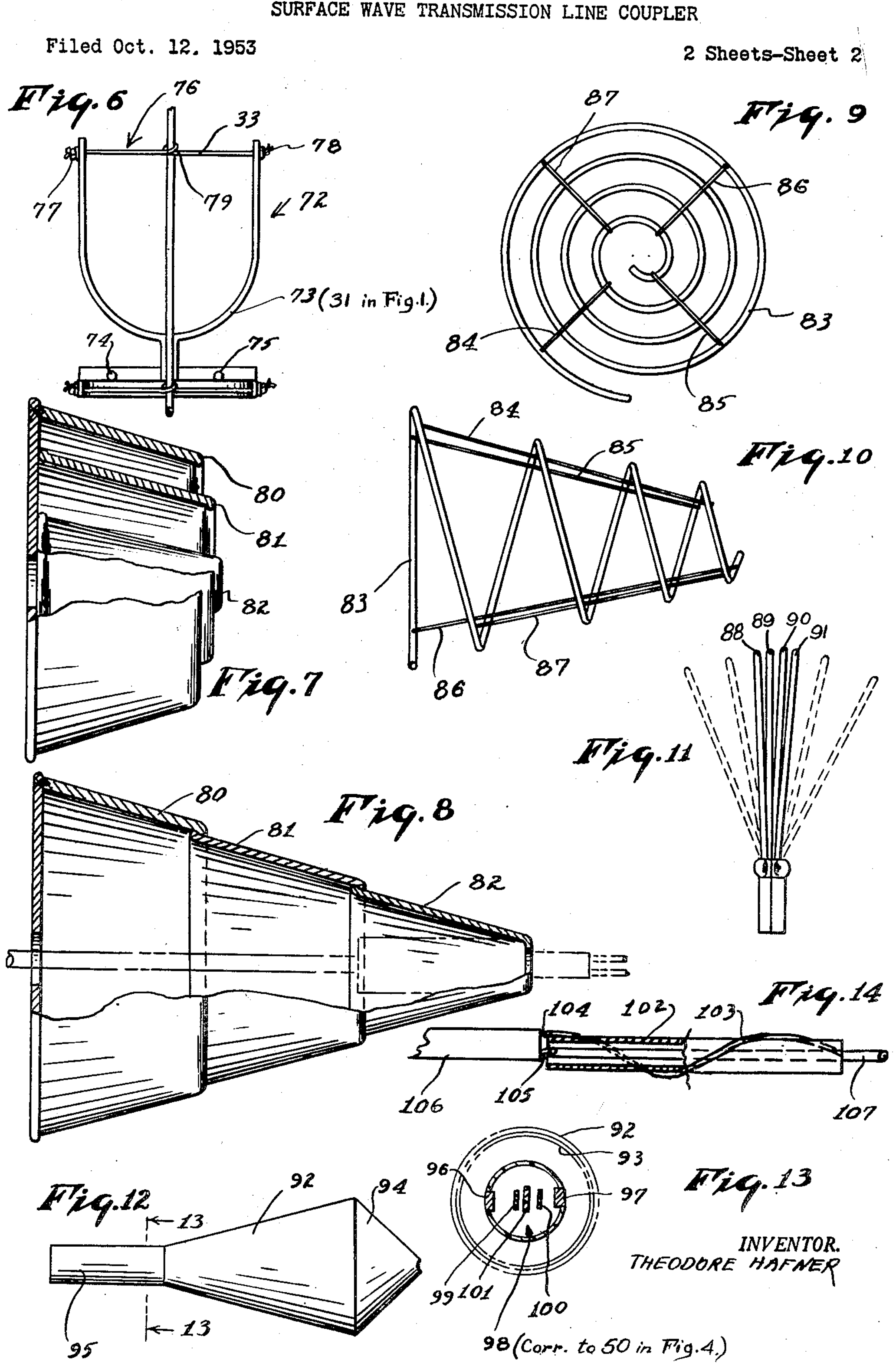
Fig. 11 represents a foldable launching device.
Figs. 12 and 13 represent a launching or receiving device made of plastic.
Fig. 14 shows another embodiment of the invention.

At this point, surface wave conductor 1 is shown to be supported by two brackets perpendicularly disposed with respect to each other, of U-shaped extension as schematically indicated at 29, 30 and more closely in Fig. 6. Supporting members 29, 30 engage surface wave conductor 1 substantially only along a very small portion or point of its longitudinal extension to reduce loss or interference with the surface wave field to a minimum.

In order to achieve this purpose, as shown in Fig. 6, the closed ends 31, 32 of the U-shape supporting brackets 29, 30 are attached, riveted or screwed on to the building or the roof at corner of building 4, while the open end of the U is bridged by a nylon line 33 or another linear shape, preferably flexible, dielectric material of the order of one wave length extension or at least an extension determined by the largest wave length transmitted over the line to reduce to a minimum interference with the field of the non-radiating surface wave transmitted in the cylindrical space coextensive with and surrounding conductor 1, as will be explained in greater detail further below.

As shown more closely in Figs. 2, 3 and 4 a launching or receiving device includes a substantially electrically conductive conical horn 34 consisting of two differently inclined extensions or sections 35, 36. The relatively long section 35 has a relatively large space angle 37 and extends from a relatively large outermost diameter or opening 38 of say 9" and corresponding—for a frequency range of 450 to 900 Mc.—to a maximum transmissible wave length of say 900 megacycles, to a distance of say 10" forming a small opening 39 of say 2" diameter. From there second section 36 also of conical shape extends with a relatively small space angle 40 over a relatively small distance of say 2" up to the innermost or smallest diameter or opening 41.

In this way, the overall dimensions of the entire horn structure 35, 36 are reduced to a minimum without substantially affecting efficiency of launching or receiving as the case may be, and within the contemplated frequency range of operation.

Instead of providing two conical sections 35, 36 of different space angles attached to or formed of one piece with each other, three or more sections may be provided of appropriate inclinations and attached to or formed of one piece with each other, to reduce length and losses still further and without departing from the scope of this disclosure.

Alternatively, as apparent from Figure 2, a gradual change of space angle may be provided beginning at least at one point 42 near the small end portion 41 and extending over section 35.

As apparent from Figs. 2, 3, and 4 the small end section 36 of horn structure 35, 36 has attached at its outside, by means of a pair of screws 43, 44, two parallel conductive side brackets 45, 46 preferably made of steel, forming the outer shell of a balancing device 47, and welded or screwed together at their free ends 48, 49.

A metal disc 50 attached to and bridging side brackets 45, 46 serves to space as well as electrically to connect side brackets 45, 46.

Metal disc 50 has a central opening 51 which is bridged by a conductive center strip 52 mechanically attached and electrically connected—by means of welding or any other way of attachment—to metal disc 50 at the center of opening 51.

Center strip 52 extends in the space between side brackets 45 and 46 substantially parallel thereto and in the center therebetween for a length of the order of one wave length and in the direction toward the small horn end 41.

In the course of this extension, center strip 52 is supported on and spaced by means of an additional spacer of dielectric material such as polyethylene or polystyrene as shown at 53 and arranged near the far end of side brackets 45, 46 or the space formed therebetween.

Another conducting U-shaped bridging member 54 connecting side brackets 45, 46 serves more clearly to define that space.

The adjacent end 55 of center strip 52 is provided with a screw or any other terminal member schematically indicated at 56 which serves to receive a blank portion of surface wave conductor 1, forming the single inward terminal of the balancing device 47.

The two outward terminals of balancing device 47 are derived from the inner end of the space formed between side brackets 45, 46 in the form of two conducting inner strips 57, 58 extending in the spaces respectively formed between side brackets 45, 46 and center strip 52, and substantially parallel to these strips. Inner strips 57, 58 extend from the inner end of the space between side brackets 45, 46 through opening 51 of spacer 50 to an insulating terminal piece 59 from which a two wire connection 60 is shown to extend to receiver or antenna terminals respectively (not shown).

While one of inner strips 57, 58 for example 57 is arranged exactly in the center between center strip 52 and side bracket 45, the other inner strip 58 is arranged somewhat closer to the side bracket 46 to compensate a certain unbalance otherwise apparent in the characteristic of balancing or impedance matching device 47.

Side brackets 45, 46 form the input conductors of balancing device 47 and also serve as attachment members for mounting balancing device 47 together with horn structure 35, 36 attached thereto, to an antenna tower or a foundation respectively.

For this purpose, the end portions 48, 49 of side brackets 45, 46 are screwed together at or otherwise attached to each other and are provided with an opening 63 permitting an earbolt or any other attachment device to be inserted therethrough and thereby to be attached over a corresponding wire or chain link 64, Fig. 1, to the top of tower 3 or at the ground to foundation 27 as the case may be.

Inner strips 57, 58 of balancing device 47 are connected to a usual type of two wire system or a coaxial cable 60 of sufficient length having blank end portions 65, 66 guided through openings 67, 68 of terminal piece 59 and soldered to the free ends of inner strips 57, 58 respectively forming the two outward terminals of balancing device 47.

In order to assure centrification of surface wave conductor 1, conductor 1 when entering or leaving the interior of launching or receiving structure 35, 36, the large opening 38 of section 35 is covered by a dielectric disc or closure member preferably of conical or otherwisely curved shape and made of polyethylene or any other suitable dielectric as shown at 69 having a central opening 70 sufficient to permit passage of surface wave conductor 1.

In this way the interior of horn structure 35, 36 will be protected from undesired electrical interference or mechanical attack.

Similarly balancing device 47 is shown to be surrounded with a dielectric cylinder 71 also made of polyethylene to serve as closure member protecting balancing device 47 from electrical as well as mechanical interference.

Fig. 6 shows a supporting member in greater detail and on an enlarged scale.

The supporting member is shown to consist of a U-shaped steel or aluminum bracket 72, the closed end 73 of which is bolted or otherwise attached to the roof or wall of the building at 74, 75 respectively in otherwise well known manner.

The open end 76 of U-bracket 72 has extended therein a nylon filament or rope 33 attached to the suspension points 77, 78.

For the U. H. F. range under consideration, the distance between points 77, 78 has been found approximately to be at least six inches.

Conductor 1 can be simply laid over, or as shown attached in a loop 79 to the center of nylon rope 76. Thus contact between surface wave conductor 1 and nylon support 33 is reduced as nearly as possible to point contact while at the same time sufficient distance is derived from the conducting or metal portions of U-bracket 72.

In this way minimum interference with the nonradiating surface wave field around conductor 1 and at the same time sufficient support and safe distancing from the wall or roof of the building are assured.

By making nylon rope 33 longer or shorter, the curvature 28 of surface wave conductor 1 as apparent from Fig. 1 can be appropriately and accurately predetermined.

In Figs. 7 and 8 a launching or receiving horn is shown to consist of a number of hollow ringshaped sections 80, 81 and 82 which can be telescoped into each other as shown in dotted lines so as to reduce packing or storage space to a minimum. In operation, the telescoped sections 80, 81 and 82 can be attached to each other by friction, screws or any other means of attachment.

In Figs. 9 and 10 the horn structure is shown to consist of a conical spring wire 84 of circular or quadrangular cross section which extends spirally in the direction of its axis and interconnected by a number of radially extending conductive wire legs 84, 85, 86 and 87 which form a conductive cone having axial and radial dimensions depending upon the frequency range to be covered.

In this way during transport or in storage the horn by being pressed together in the direction of its axis can be packed in a minimum of space.

In the modification shown in Figs. 11 the horn structure shown consists of a number of longitudinal brackets 88, 89, 90, 91 forming the corners of a pyramid which can be folder together like an umbrella and thereafter if necessary further telescoped like the tripod of a camera as schematically indicated in dotted lines.

In Figs. 12 and 13 the horn structure is shown to consist of a thermoplastic such as polyethylene appropriately molded or shaped in accordance with the requirements for the launching and receiving of surface waves, and in a manner similar to that explained with respect to Figs. 1 through 12.

Plastic cone 92 has embedded thereon or applied thereto a metallic coating 93 made in otherwise well known manner so as to make the cone conductive in accordance with the requirements of this invention.

Attached to cone 92, at the large end thereof, there is sealed or sewn or otherwise attached thereto a plastic cover 94 consisting preferably of the same insulating material as cone 92. Cone 94 serves to protect the inside of cone 92 as well as to stiffen it.

At the small end of cone 92 a cylindrical plastic cover 95 is sealed or otherwise attached enclosing the balancing device which can be constructed in a manner similar to that shown in Figs. 2 and 14.

Alternatively in accordance with this specific embodiment of the invention, plastic cylinder 95 contains the side brackets of the balancing device—which are shown in Figs. 2 through 4 at 45, 46—incorporated or applied to the plastic in the form of metallic layers or strips 96, 97 directly and conductively connected to the conductive layer 93 embedded in or applied on cone 92.

The other parts of the balancing device consisting of a metal disc 98 supporting a conductive center strip in conductive relation and a pair of parallel inner strips in insulating relation is inserted as a nut in the interior of cylinder 95 in such a way that disc 98 makes contact with side strips or layers 96, 97 while the two inner strips 99, 100 make contact with the center strip 101 and one of the side layers 96, 97 respectively.

For transport the entire structure containing cone 92, and covers 94, 95 can be folded together in a plane passing radially through the axis of the structure as indicated in Fig. 14 in dotted lines whereby the inner part of the balancing device supported on disc 98 is removed and separately added to the package.

In the modification of Fig. 14 the launching device is in the form of an insulating tube 102 around which a wire spiral 103 of a length of several feet is wound. Terminals 104, 105 of this launching device are connected at one side to a twin-lead 106 and at the other side to a surface wave conductor 107 extending through insulating tube 102 and connected to terminal 105.

The invention is not limited to the exact form, material and arrangement of launching and receiving, balancing, connecting and supporting means shown and described.

The hollow conductive cone shape may be replaced by a full dielectric cone shape, having an inclination substantially opposite to that of a conductive cone as disclosed in U. S. application Ser. No. 151,025 mentioned above and coupled capacitively instead of conductively to both the two wire system as well as the surface wave conductor, all this without departing from the scope of this disclosure.

The invention is not limited to the particular coupling shown and described between launching means and antenna. More specifically the twin lead can be replaced directly by an antenna system for example a dipole without exceeding the scope of this invention.

I claim:

1. In a system for coupling a surface wave transmission line to a two-wire transmission line, a conducting cone frustum adapted to receive said surface wave transmission line in its outer opening, at least one conductor conductively attached at one end to said frustum at its inner opening and extending substantially parallel to the axis of said frustum, another conductor extending along said axis substantially parallel to said first conductor and having one end situated near said inner opening and adapted to be connected to said surface wave transmission line, the other end of said other conductor being conductively attached to said first conductor at the other end thereof, and means for connecting said two wire transmission line to points of said two conductors, respectively, away from the other ends of said conductors.

2. System according to claim 1 comprising a cover of low wave resistance over said outer opening of said frustum having a central opening for centering said surface wave transmission line when connected to said other conductor at the end near said inner opening of said frustum.

3. In a system for coupling a surface wave transmission line to a two-wire transmission line, a conducting cone frustum adapted to receive said surface wave transmission line in its outer opening, a pair of outer conductors conductively attached at one end to said frustum at its inner opening at points situated diametrically with respect to said opening and extending in a direction substantially parallel to the axis of said frustum, an inner conductor extending along said axis substantially parallel to said outer conductors having one end situated near said inner opening, means at said end for connecting said surface wave transmission line to said inner conductor, the other end of said outer conductors being conductively attached to said inner conductor at the other end thereof, and means for connecting said two-wire transmission line to said inner conductor and to one of said outer conductors at predetermined points of said two conductors, respectively, away from the other ends of said two conductors.

4. System according to claim 3 wherein said cone frustum consists of several portions having different angles of inclination with respect to the axis of said frustum, one portion extending from the outer opening to a smaller inner opening at one angle with respect to said axis and another portion extending from said smaller inner opening to a still smaller inner opening, at an angle with respect to said axis which is smaller than said first angle.

5. System according to claim 3 wherein said outer conductors are closed at the other end; there being provided near said other end a bridging member conductively connecting the three conductors and supporting said inner conductor in its axial position.

6. System according to claim 5 comprising conducting strips extending from said predetermined points in the space between said inner and each of said outer conductors, respectively, and in a direction substantially parallel to said conductors towards said bridging member.

7. System according to claim 5 comprising another bridging member connecting said outer conductors near the closed end of said outer conductors.

8. System according to claim 6 comprising an insulating terminal member arranged near said bridging member, the latter having an aperture permitting passage of said conducting strips to said insulating terminal member.

9. System according to claim 7 comprising an insulating spacing member between said outer conductors arranged near said other bridging member.

References Cited in the file of this patent

UNITED STATES PATENTS

| | | |
|---|---|---|
| 964,737 | Ashley | July 19, 1910 |
| 1,085,813 | Knutz | Feb. 3, 1914 |
| 2,206,683 | Wolff | June 2, 1940 |
| 2,403,909 | Carter | July 16, 1946 |
| 2,478,313 | Peterson | Aug. 9, 1949 |
| 2,490,957 | Gluyas | Dec. 13, 1949 |
| 2,530,048 | Driscoll | Nov. 14, 1950 |
| 2,548,821 | Riblet et al. | Apr. 10, 1951 |
| 2,586,754 | Wild | Feb. 19, 1952 |
| 2,596,190 | Wiley | May 13, 1952 |
| 2,659,817 | Cutler | Nov. 17, 1953 |
| 2,671,883 | Dicke | Mar. 9, 1954 |
| 2,685,068 | Goubau | July 27, 1954 |

OTHER REFERENCES

"CQ," April 1953, pages 13–16.